(12) United States Patent
Deluca et al.

(10) Patent No.: US 11,108,912 B2
(45) Date of Patent: Aug. 31, 2021

(54) AUTOMATED WRITTEN INDICATOR FOR SPEAKERS ON A TELECONFERENCE

(71) Applicant: International Business Machines Corporation, Armonk, NY (US)

(72) Inventors: Lisa Seacat Deluca, Baltimore, MD (US); Kelley Anders, East New Market, MD (US); Jeremy A. Greenberger, San Jose, CA (US); Jeremy R. Fox, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 66 days.

(21) Appl. No.: 16/182,311

(22) Filed: Nov. 6, 2018

(65) Prior Publication Data
US 2020/0145536 A1    May 7, 2020

(51) Int. Cl.
*G10L 17/00* (2013.01)
*H04M 3/56* (2006.01)
*G06F 40/109* (2020.01)

(52) U.S. Cl.
CPC .......... *H04M 3/568* (2013.01); *G06F 40/109* (2020.01); *G10L 17/00* (2013.01); *H04M 3/567* (2013.01); *H04M 2201/41* (2013.01); *H04M 2201/60* (2013.01)

(58) Field of Classification Search
CPC .. H04M 3/568; H04M 3/567; H04M 2201/41; H04M 2201/60; G06F 40/109; G10L 17/005
See application file for complete search history.

(56) References Cited

U.S. PATENT DOCUMENTS

| | | | |
|---|---|---|---|
| 9,071,728 B2 | 6/2015 | Begeja | |
| 9,613,636 B2 | 4/2017 | Gibbon | |
| 9,691,393 B2 | 6/2017 | Rasmussen | |
| 2005/0018828 A1* | 1/2005 | Nierhaus | H04L 29/00 379/202.01 |
| 2010/0177970 A1 | 7/2010 | King et al. | |

(Continued)

OTHER PUBLICATIONS

AT&T, Welcome to AT&T Connect Audio Conference Monitor, https://teleconference.uc.att.com/ecm/?bp=8884266840&mac=NNNNNNN, 2018.

(Continued)

*Primary Examiner* — Nafiz E Hoque
(74) *Attorney, Agent, or Firm* — Garg Law Firm, PLLC; Rakesh Garg; Michael O'Keefe

(57) ABSTRACT

While a teleconference is occurring, data of a teleconference is analyzed to determine first participant data associated with a first speaker and second participant data associated with a second speaker. At a different application, addition of a first speaker indicator and a second speaker indicator to a text entry of a user is caused, the first speaker indicator added concurrently with identification that the first speaker is speaking and the second speaker indicator added concurrently with identification that the second speaker is speaking. At the different application, addition of key information to a text entry of a user is caused, the key information comprising participant data associated with the first speaker and second participant data associated with the second speaker.

20 Claims, 8 Drawing Sheets

(56) References Cited

U.S. PATENT DOCUMENTS

| | | |
|---|---|---|
| 2010/0278453 A1 | 11/2010 | King |
| 2013/0013991 A1 | 1/2013 | Evans |
| 2014/0278405 A1 | 9/2014 | Peters |
| 2017/0060828 A1* | 3/2017 | Rainisto ............... G06F 3/16 |
| 2018/0308501 A1* | 10/2018 | Johnson ............. G06F 40/20 |
| 2019/0258704 A1* | 8/2019 | Mertens ............ G06F 40/166 |

OTHER PUBLICATIONS

IBM, Look who's talking: IBM debuts Watson SpeechTo Text "Speaker Diarization" beta, Dec. 15, 2016.

* cited by examiner

Hayes, Weldon L., et al. "Automated Written Indicator for Speakers on a Teleconference." US 11,108,912 B2.

AUTOMATED WRITTEN INDICATOR FOR SPEAKERS ON A TELECONFERENCE

TECHNICAL FIELD

The present invention relates generally to a method, system, and computer program product for speaker indication in conference calling. More particularly, the present invention relates to a method, system, and computer program product for an automated written conference call speaker indicator for text entry.

BACKGROUND

A teleconference—also known as an audio conference, telephone conference, conference call, web conference, or webinar—is the live exchange and mass articulation of information among more than two users remote from one another but linked by a telecommunications system. Such a telecommunications system supports teleconferencing by providing one or more of audio, video, and data services, linked by a telephone network, computer network, or a combination. Typically, users join a teleconference by dialing a telephone number—typically for voice-only communication, or accessing a website for an equipment-dependent, implementation-dependent, and call-dependent combination of screen display, audio, and video communication.

SUMMARY

The illustrative embodiments provide a method, system, and computer program product. An embodiment includes a method that analyzes, while a teleconference is occurring, data of the teleconference to determine first participant data associated with a first speaker and second participant data associated with a second speaker. An embodiment causes, at a different application, addition of a first speaker indicator and a second speaker indicator to a text entry of a user, the first speaker indicator added concurrently with identification that the first speaker is speaking and the second speaker indicator added concurrently with identification that the second speaker is speaking. An embodiment causes, at the different application, addition of key information to a text entry of a user, the key information comprising participant data associated with the first speaker and second participant data associated with the second speaker An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
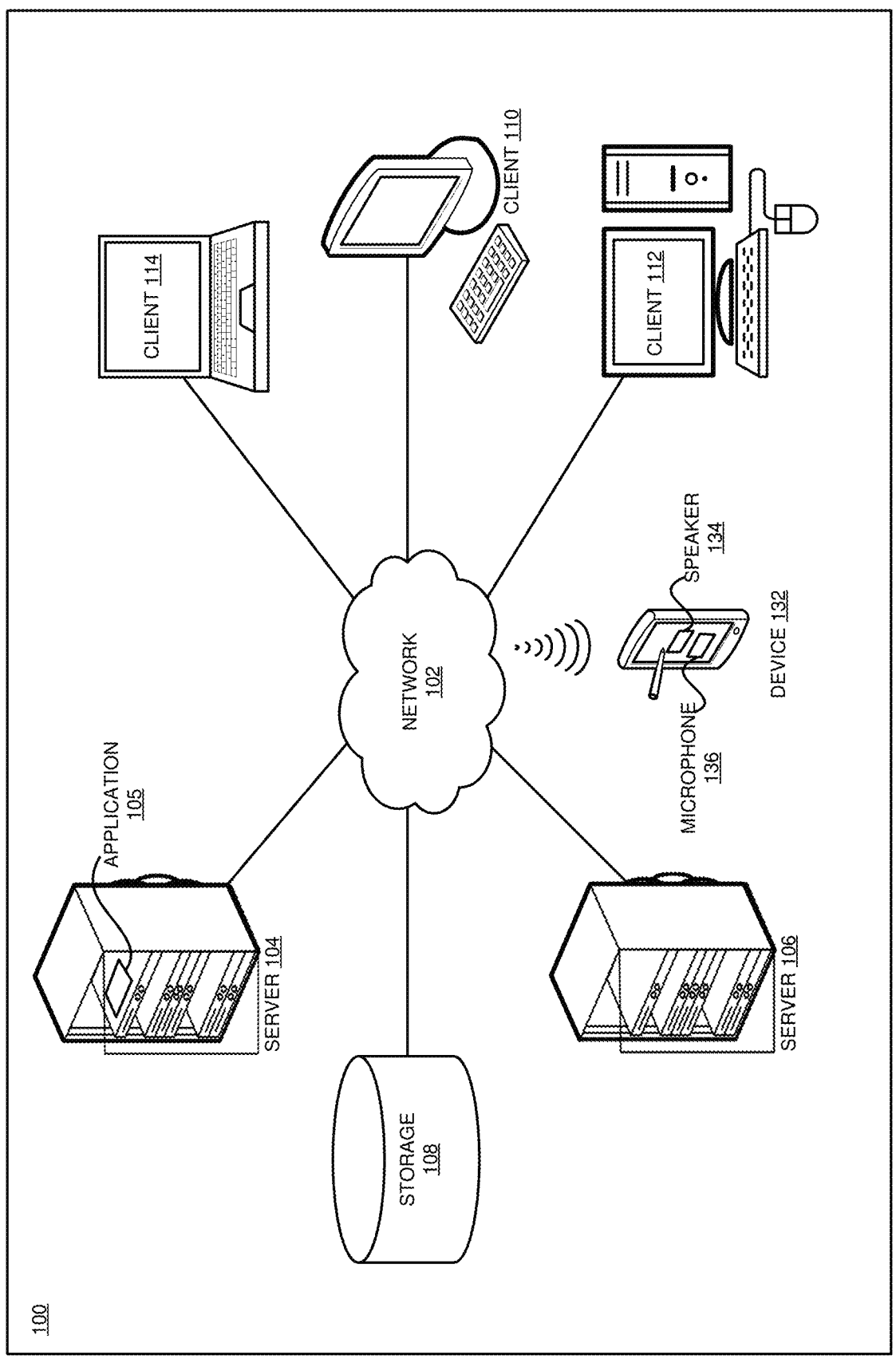
FIG. 1 depicts a block diagram of a network of data processing systems in which illustrative embodiments may be implemented.

The illustrative embodiments recognize that often, when participating in a teleconference, users find it difficult to identify the person who is currently speaking (current speaker, speaker) by name. Different speakers' voices often sound similar, particularly over poor-quality audio connections. Speakers often neglect to identify themselves after the first time they speak, or at all. Participants may not be familiar enough with a particular speaker to recognize a speaker's voice and associate that speaker with a name. Further, without speaker identification, users may find it hard to interpret the context and background of individual participants' comments.

Teleconferences conducted using appropriately capable technology may display an indicator of which participant is speaking, based on sound detection at the microphone or telephone of the speaker. Teleconferences conducted using appropriately capable technology may also use voice recognition techniques to identify a speaker. However, participants in a teleconference may not be able to perceive such indications for a variety of technological and circumstantial reasons. For example, a participant may often take notes during a call. When taking notes, the participant may not be able to see visual indicators of which participant is speaking or see the results of voice recognition.

The illustrative embodiments recognize that users need a capability, within other applications being used in conjunction with a teleconferencing application, to identify the speaker of specific comments made during the teleconference. For example, if a notes taking application is used to take notes as a teleconference is occurring, a capability enabling the notes-taking application to associate notes on particular speakers' comments with an identification of which speaker made each comment will be advantageous. If a slideshow application, audio annotation application, document editor, project planning tool, auditing application, or an application of another type is used, a similar capability to identify the speaker and associate the identified speaker's comments with a product of the application will be useful.

The illustrative embodiments recognize that the presently available tools or solutions do not address these needs or provide adequate solutions for these needs. The illustrative embodiments used to describe the invention generally address and solve the above-described problems and other problems related to an automated written teleconference speaker indicator for text entry.

An embodiment can be implemented as a software application. The application implementing an embodiment can be configured as a modification of an existing teleconferencing system, writing system, or both, as a separate application that operates in conjunction with an existing teleconferencing system, writing system, or both, a standalone application, or some combination thereof.

Particularly, some illustrative embodiments provide a method by which the current speaker on a teleconference can be determined and automatically indicated within a writing application.

An embodiment receives a notification that a user is participating in a teleconference and desires the services provided by the embodiment. The embodiment also receives voice data and, if available, associated speaker data from a system hosting the teleconference, as the teleconference is occurring. A system hosting the teleconference collects voice data from the microphones included in participants' devices, such as telephones and computers, as participants speak during the teleconference. A system hosting the teleconference collects associated speaker data—for example, a speaker's name, if he has identified himself to the teleconference system, or an identification of the device a speaker is using to connect to the teleconference.

An embodiment includes a voice identification capability. Using known techniques, an embodiment analyzes voice data to identify speech patterns associated with speakers, associate each identified speech pattern with a particular speaker, and tag each of the unique voices participating in the call as each participant speaks. For example, given a conference call with three participants, Anna, Bob, and Chris, Anna might speak first and be tagged as "voice 1". If Bob speaks next, the embodiment recognizes, using known voice recognition techniques, that Bob's voice is sufficiently different from Anna's as to be considered a new participant on the call—thus Bob's voice is tagged as "voice 2". If Anna then responds, the embodiment recognizes, using known voice recognition techniques, that Anna's voice as the same (within a similarity threshold) as the voice previously tagged as "voice 1". If Chris speaks next, the embodiment recognizes that Chris's voice is sufficiently different from both Anna's and Bob's as to be considered a new participant on the call—thus Chris's voice is tagged as "voice 3".

An embodiment also associates tagged voices with other available participant information. For example, a teleconferencing system may collect user data, such as the user's name and associated account information, or the telephone number, IP address, location information, or other identification of the device the user is using to access the teleconference. An embodiment receives such data in any convenient form, such as in a set of data regarding all participants in the call, as each user joins the call, as each user speaks on the call. An embodiment also collects such data directly, when available. For example, a regular user of the embodiment can supply user data, such as the user's name and additional preferences, for use every time the user utilizes the embodiment. As well, when each user speaks, an embodiment receives data as to which input device generated the speech. Thus, to continue the previous example, an embodiment has received data showing that Anna is using device 1, Bob is using device 2, and Chris is using device 3. Thus, when Anna speaks and her voice is tagged as "voice 1", the embodiment knows that "voice 1" came from device 1, and associates "voice 1" with all available data for device 1. If Anna has an account on the teleconferencing system, and has previously provided her name, email address, and additional information, instead of referring to "voice 1" the embodiment can now reference "Anna" instead. If Bob does not have an account, his name may not be available—but the telephone number he used to connect to the call (e.g., (512) 555-1212) is available. In this case, the embodiment can refer to "voice 2" as "(512) 555-1212". If Chris also does not have an account, but connected to the call anonymously via a website, no additional user data is available for Chris and the embodiment continues to reference her as "voice 3". Donna, a regular user of the embodiment, is also participating on the call. When she first speaks on the call, the embodiment tags her voice both with "voice 4" and "Donna", since her name and other information are already known.

An embodiment also uses speech analysis and natural language understanding techniques to generate additional participant information. For example, an embodiment can use well-known speech analysis techniques to attempt to classify voices as male or female, or make further distinctions such as a man with an exceptionally deep voice or a woman with an exceptionally high voice. An embodiment can use well-known speech-to-text techniques to convert a participant's speech to text, then analyze the result text using well-known natural language understanding techniques to classify the speech by use of keywords, emotion, or sentiment. For example, using such techniques an embodiment may classify one speaker as sounding angry and another who used the word "leverage" very often. Similarly, an embodiment can identify speakers who speak succinctly, provide verbose contributions, are largely silent participants or observers, appear to be an authority figure in the conference, and other characterizations of the various participants.

An embodiment uses this additional participant information to help identify teleconference participants, particularly when their names are not available. For example, an embodiment may tag a fifth speaker on a call with "voice 5", and further classify this speaker as a man with an exceptionally deep voice. Similarly, an embodiment may tag a sixth speaker on a call with "voice 6", and further classify this speaker as someone who used the word "leverage" very often. Such information can be useful in identifying call participants, even when participants' names are not available, particularly upon later review of notes taken during the call.

As an embodiment identifies and tags each speaker in the teleconference, the embodiment passes tagged voice information, along with associated user data, to another application that is operating in conjunction with the conferencing application, e.g., an editor or a writing system. The writing system may be any software application that allows a user to enter text, including a word processing application, an outlining application, a text-entry application, or a text-entry feature of a collaboration application. The writing system may also be implemented as a text entry feature of a website. Text entered by the user may be stored locally, remotely, or a combination of locally and remotely.

An embodiment associates the writing system with the ongoing call using any suitable technique, such as by using an application programming interface (API), a messaging interface, or a shared memory coupling. For example, the writing system may include a menu option or other command to begin receiving speaker data, or the teleconferencing system may include a menu option, link to a website, or other command to initiate a text-entry component that receives speaker data. Alternatively, an embodiment recognizes that a teleconference and a text-entry application are both active, and asks the user if he or she wants to use the application to take notes during the call. Alternatively, an embodiment recognizes that a teleconference and a text-entry application are both active and simply associates the two without asking the user. Alternatively, an embodiment may use information in a calendar entry or other teleconference-related information to initiate both the teleconference and the text-entry components and associates the two. Even further variations are known to those of ordinary skill in the art and contemplated within the scope of the embodiments.

As a user uses the writing system during the call, typically to take notes on what is said during the call, an embodiment causes an indicator corresponding to the current speaker to be added to the text. One speaker indicator may be the color of the text. For example, consider a conference call with three participants, Anna, Bob, and Chris. Anna might speak first and be tagged as "voice 1". An embodiment notifies the writing system that "voice 1" is speaking, triggering text to be displayed in color 1—perhaps black—as the user types text. If Bob speaks next and is tagged as "voice 2", the embodiment notifies the writing system that "voice 2" is speaking, triggering text to be displayed in color 2—perhaps blue—as the user types text. If Anna then responds, the embodiment triggers a text color change back to color 1. If Chris speaks next and is tagged as "voice 3", the embodiment triggers a third text color change to color 3—perhaps red.

An embodiment can associate a color with a speaker using any suitable scheme. For example, an embodiment may use a static set of colors, thus that voice 1 is always indicated by color 1 in the set, voice 2 is always indicated by color 2 in the set, and so on. Thus, when the user tagged with "voice 1" speaks, the text color changes to color 1. As a result, any text entered while the user tagged with "voice 1" is speaking will be displayed in color 1, and any text entered while the user tagged with "voice 2" is speaking will be displayed in color 2. Using speaker indicators during text entry allows the entered text to be automatically associated with the speaker, without requiring the note-taker to guess.

The set of colors may be static across all calls, may be associated with a theme and be changed according to a theme change, or chosen randomly each time a new call is initiated. An embodiment allows a user to configure the set of colors, for example changing color 1 from red to blue. An embodiment may allow a known user to configure his or her preferred displayed color, even when other users enter text. For example, user Anna, known to the system, is always associated with purple, so whenever any user enters text associated with Anna speaking, the text is displayed in purple. An embodiment allows the note-taker to configure his or her preferred displayed color when he or she enters text. For example, Bob may like blue, so configures his system to display notes he takes in blue, in every call he participates in, for consistency. An embodiment assigns colors by gender, either based on users' voices or additional user data. For example, the embodiment may assign different shades of blue to different male speakers and different shades of pink to different female speakers. Other color selection schemes are also possible and contemplated within the scope of the embodiments.

Another speaker indicator may be a particular style of text (for example, bold or italic text, or a text size) or a particular text font associated with each speaker. For example, one speaker might be denoted using the Courier font, while another speaker might be denoted using the Times New Roman font. As another example, one speaker might be denoted using bold type, while another speaker might be denoted using italic type. Similarly, one speaker might be denoted using 10 point type, while another speaker might be denoted using 12 point type.

Another speaker indicator may be a background color of the text. For example, one speaker might be denoted using black text on a yellow background, while another speaker might be denoted using black text on a green background. An embodiment allows a user to configure each speaker indicator scheme similarly to the configuration of color speaker indicators described herein.

Another speaker indicator may be a particular character sequence, of one or more characters, associated with each speaker. For example, if Anna speaks first on a call, an embodiment could insert the sequence [*] into the text to denote that any text entered after this character sequence relates to what Anna said. If Bob speaks next, an embodiment could insert the sequence [-] to denote that any text entered after this character sequence relates to what Bob said. Alternatively, an embodiment can use labels, such as [voice #1], [voice #2], and so on, instead of symbols. Character sequences may be configured using any suitable scheme, similar to but not limited to the configuration options delineated for colors, and may be of any suitable length.

Another speaker indicator may be the initials of each speaker. For example, if Anna Jones speaks first on a call, an embodiment could insert the sequence [AJ] into the text to denote that any text entered after this character sequence relates to what Anna said. If Bob Smith speaks next, an embodiment could insert the sequence [BS] to denote that any text entered after this character sequence relates to what Bob said. Such initials may be derived from available user data. For example, a user may have entered his or her name into the system and provided initials as well. Alternatively, an embodiment may derive the initials from the user's full name. Initials are not limited to two characters. Other numbers of characters, and other methods of configuring initials for display, may be configured using any suitable scheme, similar to but not limited to the configuration options delineated for colors.

Another speaker indicator may be a symbol, either text or graphical, associated with each speaker. For example, such a symbol could be a text emoticon such as :-) or :-( or a graphical emoji such as a smiling face. Yet another speaker indicator may be a photograph of or other graphical item, such as an icon, associated with each speaker. Yet another speaker indicator may be one or more items from a speaker's profile information, such as the speaker's email address, name, social media handles, phone numbers, or a link or other means of accessing a speaker's profile information. Such a symbol, photograph, other graphical item, or profile information identifies a speaker in the same way as a character sequence or initials do, and are configurable using any suitable method. Such speaker indicators may be placed before, after, or in any other suitable place relative to the associated text.

An embodiment allows a user to reserve a color or other speaker indicator for text not associated with a particular speaker. A user may trigger this color or other indicator using a shortcut, special command, or any other suitable method, enter text as desired, then return to automatic speaker indication using another shortcut, special command, or any other suitable method.

An embodiment generates key information matching speaker indicators to any available user data. For example, if color indicators were used, and the embodiment has matched voice 1 with Anna, voice 2 with the telephone number (512)555-1212 (but no name or additional identifying information), voice 3 with a network connection originating in Austin (but no name or additional identifying information), voice 4 with no name, but a classification of a man with a very deep voice, and voice 5 with no name but a classification of someone who used the word "leverage" very often, the key information might be: black=Anna, blue=caller from (512)555-1212, red=participant from Austin, purple=man with deep voice, green=person who used "leverage" often. The embodiment associates the key information with the note text using any suitable method, such as by adding the key at the bottom of the note text, by displaying speaker information (for example, within a tooltip) when the user hovers a displayed pointing device over a portion of the note text, or in a separate document associated with the note text document.

For example, consider a planning team conducting a teleconference to discuss an agenda for an upcoming meeting. Anna is Mary's assistant and has agreed to take notes. Anna associates the teleconference and the text-entry system she is using, then begins to take her notes. As each participant speaks, the embodiment automatically causes the addition of an indicator of which participant spoke to the note text. Once the call is complete, the embodiment causes the addition of the speaker key to the note text. As a result, Anna did not have to manually enter information regarding each speaker, but her notes might read, "[@]Welcomes everyone to the call, purpose is to get consensus on upcoming meeting agenda. [#]Attendees Mark, Mary, Sue, Kelly, me. [@]Will talk use cases, goal is to drive revenue across the business. [#]Need Bob to send invites to admins to block off time that works for everyone. [@]Yes, SVP will be there too. [$]Ok to show slides from last presentation? [@]Yes. [$]Will pull out slides 7 & 8, they're confidential. [%]Adding details about Project Z. [@]Meeting again tomorrow, same time." The related key information might be: "[@]—Mary, [#]—Joe, [$]—Mark, [%]—Kelly".

The manner of an automated written teleconference speaker for text entry described herein is unavailable in the presently available methods. A method of an embodiment described herein, when implemented to execute on a device or data processing system, comprises substantial advancement of the functionality of that device or data processing system by determining the current speaker on a teleconference and automatically indicating the current speaker for text entry.

The illustrative embodiments are described with respect to certain types of teleconferences, associated applications, writing and text-entry systems, interfaces, classifications, tags, associations, attributes, user data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
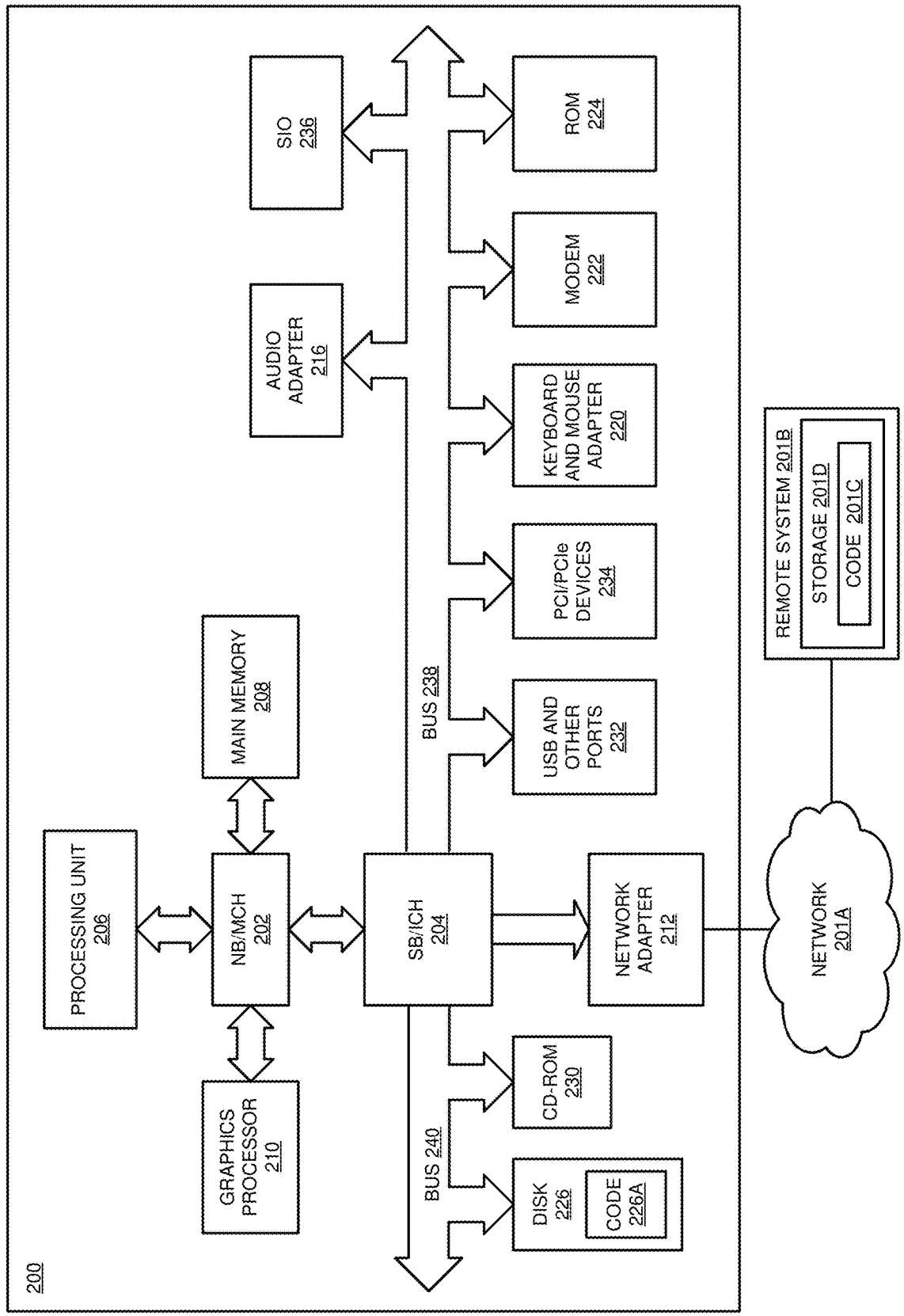
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Device 132 includes speaker 134 and microphone 136, for use when device 132 is used to participate in a teleconference. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 may also run in any suitable device, such as servers 104 and 106, clients 110, 112, and 114, and device 132. A user may connect to a teleconference using any suitable device, for example device 132 and clients 110, 112, and 114.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro- SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
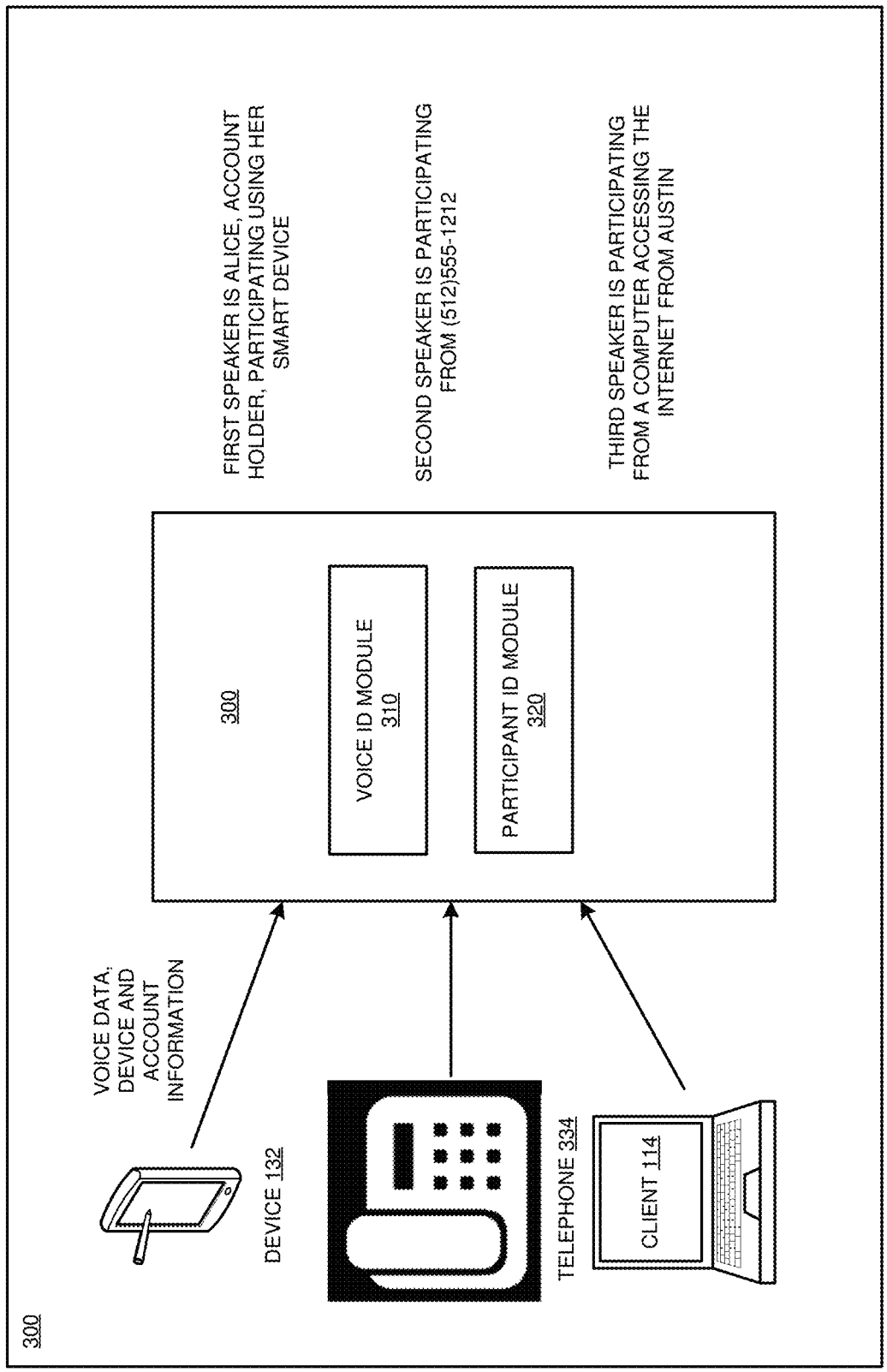
FIG. 3 depicts a block diagram of an example configuration for an automated written conference call speaker indicator for text entry in accordance with an illustrative embodiment.

With reference to FIG. 3, this figure depicts a block diagram of an example configuration for an automated written conference call speaker indicator for text entry in accordance with an illustrative embodiment. Application 300 is an example of application 105 in FIG. 1 and executes in server 104 in FIG. 1. Device 132 and client 114 are the same as device 132 and client 114 in FIG. 1.

Participants in a teleconference access the teleconference through any of device 132 and client 114, or any other suitable device. Device 132 and client 114 provide voice data of the teleconference, device information of devices used to access the teleconference, and teleconference user account information to application 300.

Application 300 includes voice identification module 310 and participant identification module 320. Voice identification module 310 uses the voice data of the teleconference, as the teleconference is occurring, to tag each of the unique voices participating in the call as each participant speaks. For example, given a conference call with three participants, Anna, Bob, and Chris, Anna might speak first and be tagged as "voice 1". If Bob speaks next, voice identification module 310 recognizes that Bob's voice is sufficiently different from Anna's as to be considered a new participant on the call—thus Bob's voice is tagged as "voice 2". If Anna then responds, voice identification module 310 recognizes her voice as the same (within a similarity threshold) as the voice previously tagged as "voice 1". If Chris speaks next, voice identification module 310 recognizes that Chris's voice is sufficiently different from both Anna's and Bob's as to be considered a new participant on the call—thus Chris's voice is tagged as "voice 3".

Participant identification module 320 associates tagged voices with other available participant information, such as any available device and account information. Account information may include the user's name, initials, and other configuration and preference settings. Device information may include the telephone number, IP address, or other identification of the device the user is using to access the teleconference. Thus, continuing the previous example, application 300 has received data showing that Anna is accessing the teleconference using device 132, Bob is using telephone 334, and Chris is using client 114, a laptop computer. Thus, when Anna speaks and her voice is tagged as "voice 1", participant identification module 320 knows that "voice 1" came from device 132, and associates "voice 1" with all available data for device 132. If Anna has an account on the teleconferencing system, and has previously provided her name, email address, and additional information, instead of referring to "voice 1" application 300 can now reference "Anna" instead. If Bob does not have an account, his name may not be available—but the telephone number he used to connect to the call (e.g., (512) 555-1212)

is available. In this case, application 300 can refer to "voice 2" as "(512) 555-1212". If Chris also does not have an account, but connected to the call anonymously via a website, no additional user data is available for Chris and application 300 continues to reference her as "voice 3".

Figure 4:
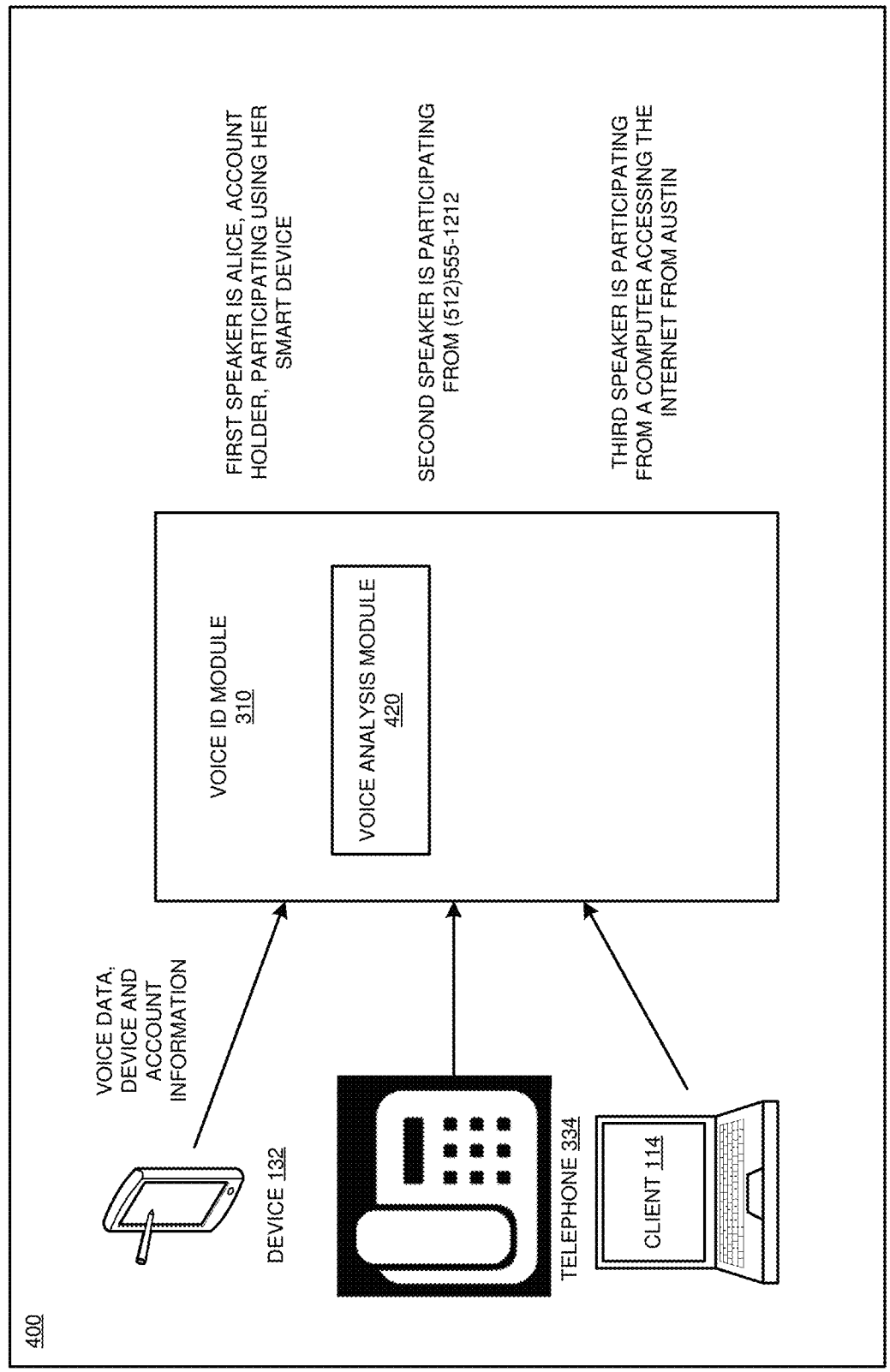
FIG. 4 depicts a block diagram of a portion of an example configuration for an automated written conference call speaker indicator for text entry in accordance with an illustrative embodiment.

With reference to FIG. 4, this figure depicts a block diagram of a portion of an example configuration for an automated written conference call speaker indicator for text entry in accordance with an illustrative embodiment. In particular, FIG. 4 provides more detail of voice identification module 310 in FIG. 3. Voice identification module 310, device 132, telephone 334, and client 114 are the same as voice identification module 310, device 132, telephone 334, and client 114 in FIG. 3.

Voice identification module 310 includes voice analysis module 420, which uses speech analysis techniques to classify the voice data of speakers on the teleconference. For example, voice analysis module 420 analyzes the voice data of speakers to classify speakers by voice pitch, and attempt to identify speakers as male or female.

Figure 5:
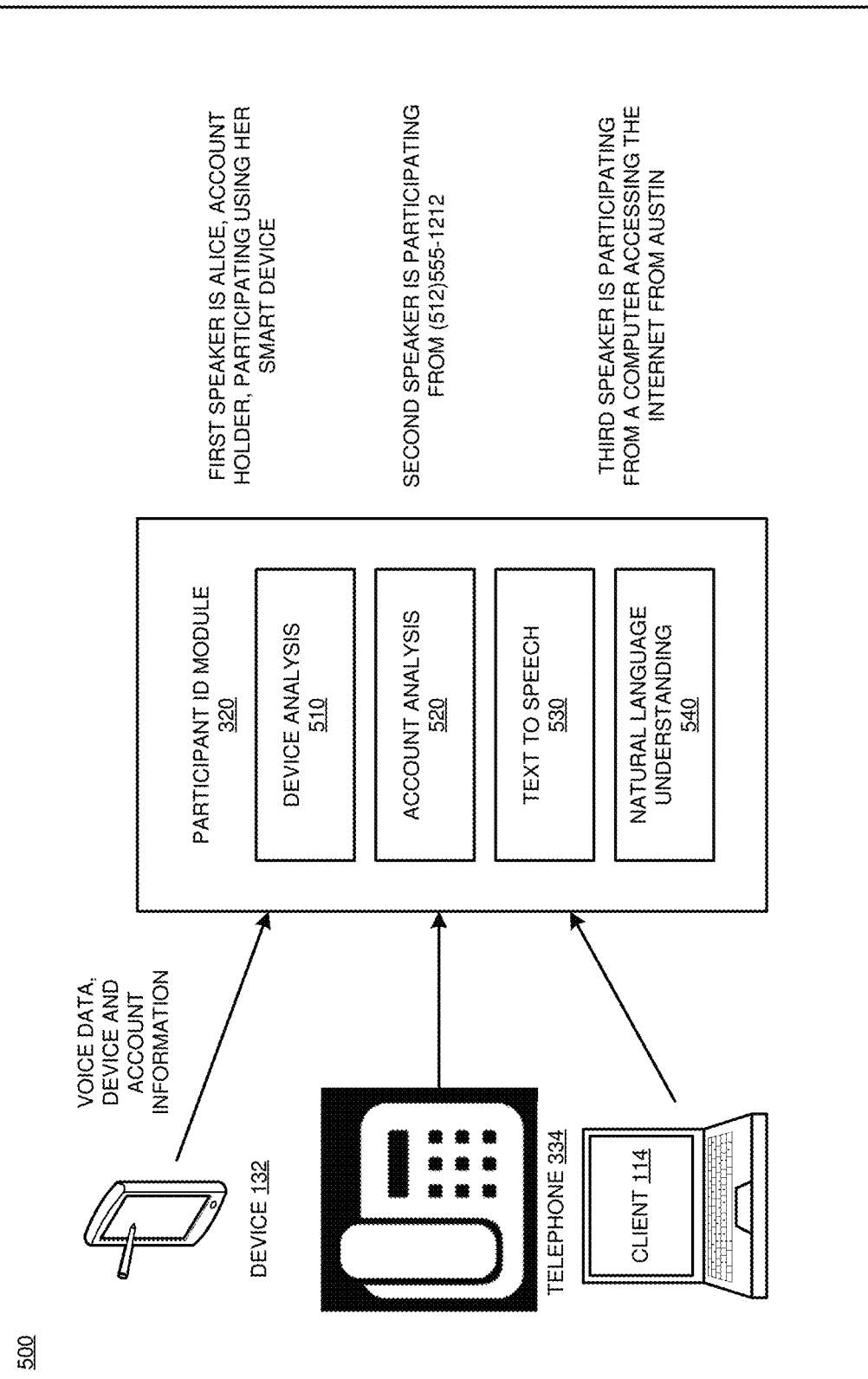
FIG. 5 depicts a block diagram of a portion of an example configuration for an automated written conference call speaker indicator for text entry in accordance with an illustrative embodiment.

With reference to FIG. 5, this figure depicts a block diagram of a portion of an example configuration for an automated written conference call speaker indicator for text entry in accordance with an illustrative embodiment. In particular, FIG. 5 provides more detail of participant identification module 320 in FIG. 3. Participant identification module 320, device 132, telephone 334, and client 114 are the same as participant identification module 320, device 132, telephone 334, and client 114 in FIG. 3.

Participant identification module 320 includes device analysis module 510, account analysis module 520, text to speech module 530, and natural language understanding module 540. Device analysis module 510 analyzes any available device data of the device the user is using to access the teleconference, such as the device's telephone number, IP address, location information, or other identification. Account analysis module 520 analyzes teleconference user account data to determine the user's name, initials, and other associated account information that may be useful in differentiating speakers on the teleconference. Text to speech module 530 converts voice data received during the teleconference to text for analysis by natural language understanding module 540. Participant identification module 320 uses such analysis to classify teleconference speakers' speech by their use of keywords, emotion, or sentiment. For example, using such techniques participant identification module 320 may classify one speaker as sounding angry and another who used the word "leverage" very often.

Figure 6:
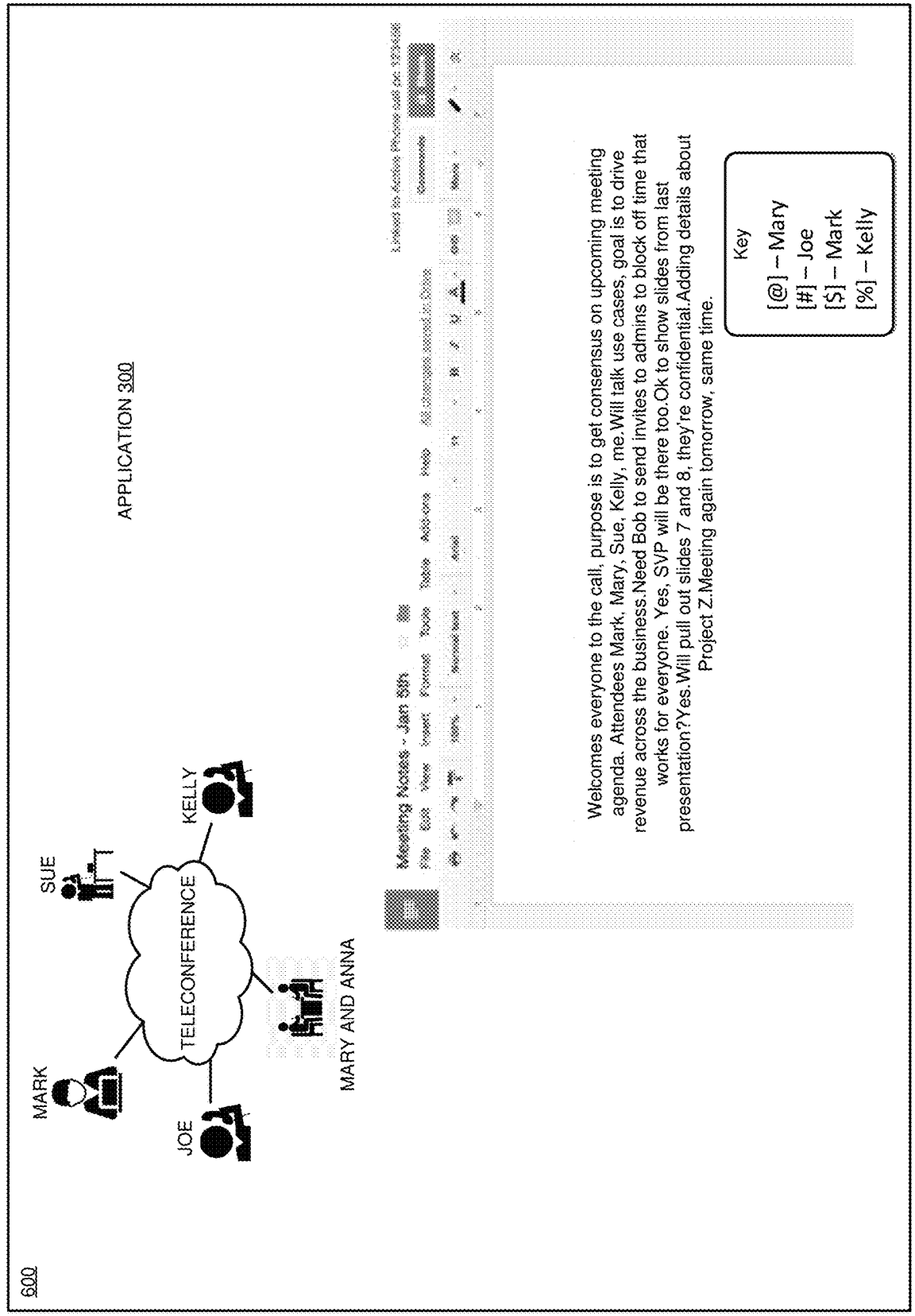
FIG. 6 depicts an example teleconference and resulting text for an automated written conference call speaker indicator for text entry in accordance with an illustrative embodiment.

With reference to FIG. 6, this figure depicts an example teleconference and resulting text for an automated written conference call speaker indicator for text entry in accordance with an illustrative embodiment. Application 300 in FIG. 6 is the same as application 300 in FIG. 3.

In particular, application 300 receives data from a teleconference with five speakers: Mark, Mary, Sue, Kelly, and Joe. Anna is Mary's assistant and has agreed to take notes. Anna associates the teleconference and the text-entry system she is using, then begins to take her notes. As each participant speaks, application 300 automatically causes the addition of an indicator of which participant spoke to the note text. Once the call is complete, application 300 causes the addition of the speaker key to the note text. As a result, Anna did not have to manually enter information regarding each speaker, An example of her notes and the associated speaker key are shown in FIG. 6.

Figure 7:
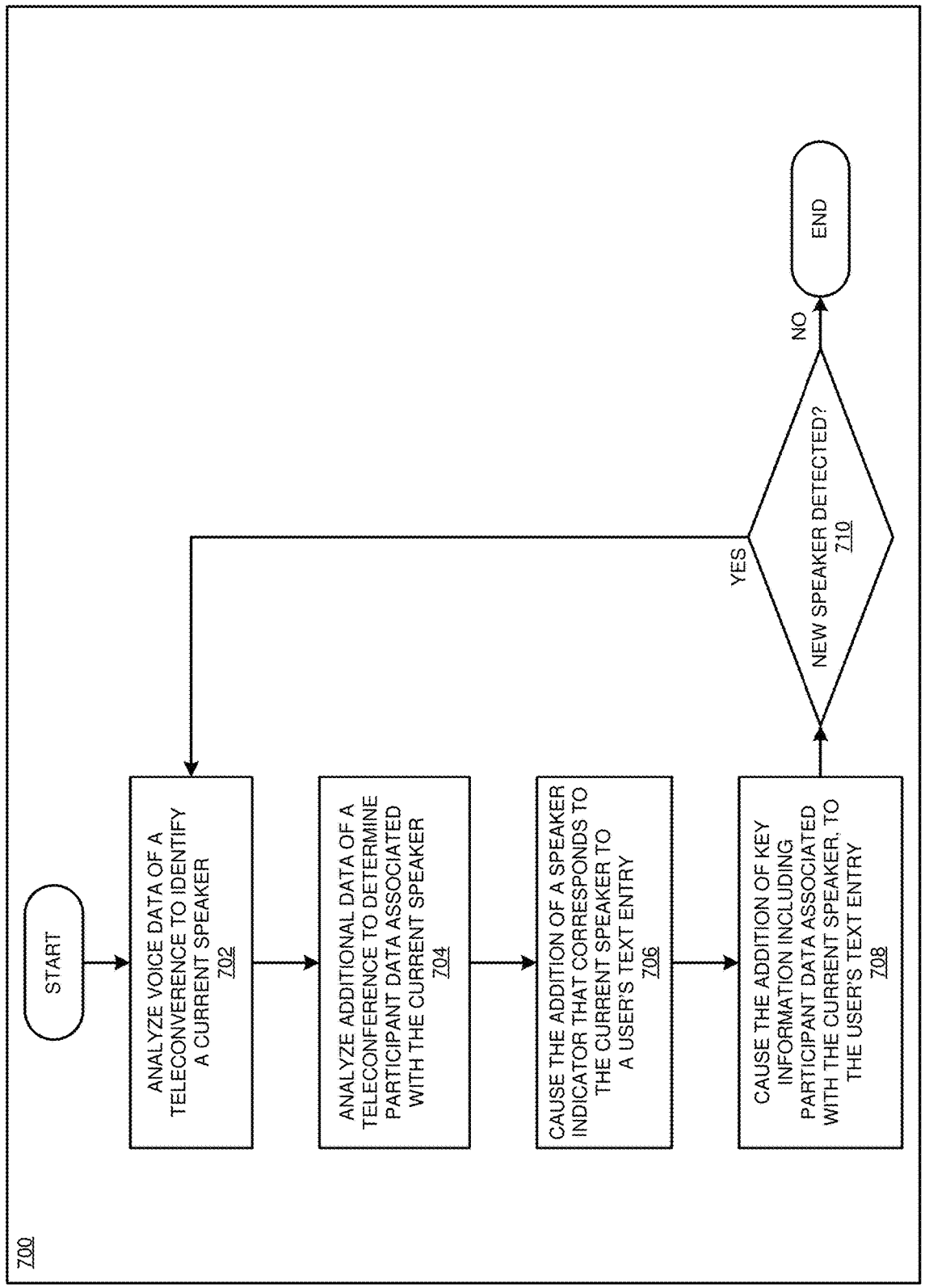
FIG. 7 depicts a flowchart of an example process for an automated written conference call speaker indicator for text entry in accordance with an illustrative embodiment.

With reference to FIG. 7, this figure depicts a flowchart of an example process for an automated written conference call speaker indicator for text entry in accordance with an illustrative embodiment. Process 700 can be implemented in application 300 in FIG. 3.

In block 702, the application analyzes voice data of a teleconference, as the teleconference is occurring, to identify a current speaker. In block 704, the application analyzes additional data of the teleconference to determine participant data associated with the current speaker. In block 706, the application causes the addition of a speaker indicator that corresponds to the current speaker to a user's text entry. For example, the speaker indicator could be a particular color of text or background of text, or a text sequence or graphical indicator. In block 708, the application causes the addition of key information, including participant data associated with the current speaker, to the user's text entry. For example, if the current speaker is indicated by blue text, and the application has determined that the current speaker is named Anna, the key information would include the information that blue text corresponds to Anna. In block 710, the application checks whether a different speaker has been detected. If so ("YES" path of block 710), the application returns to block 702 to process the different speaker's speech. If not, the application ends.

Figure 8:
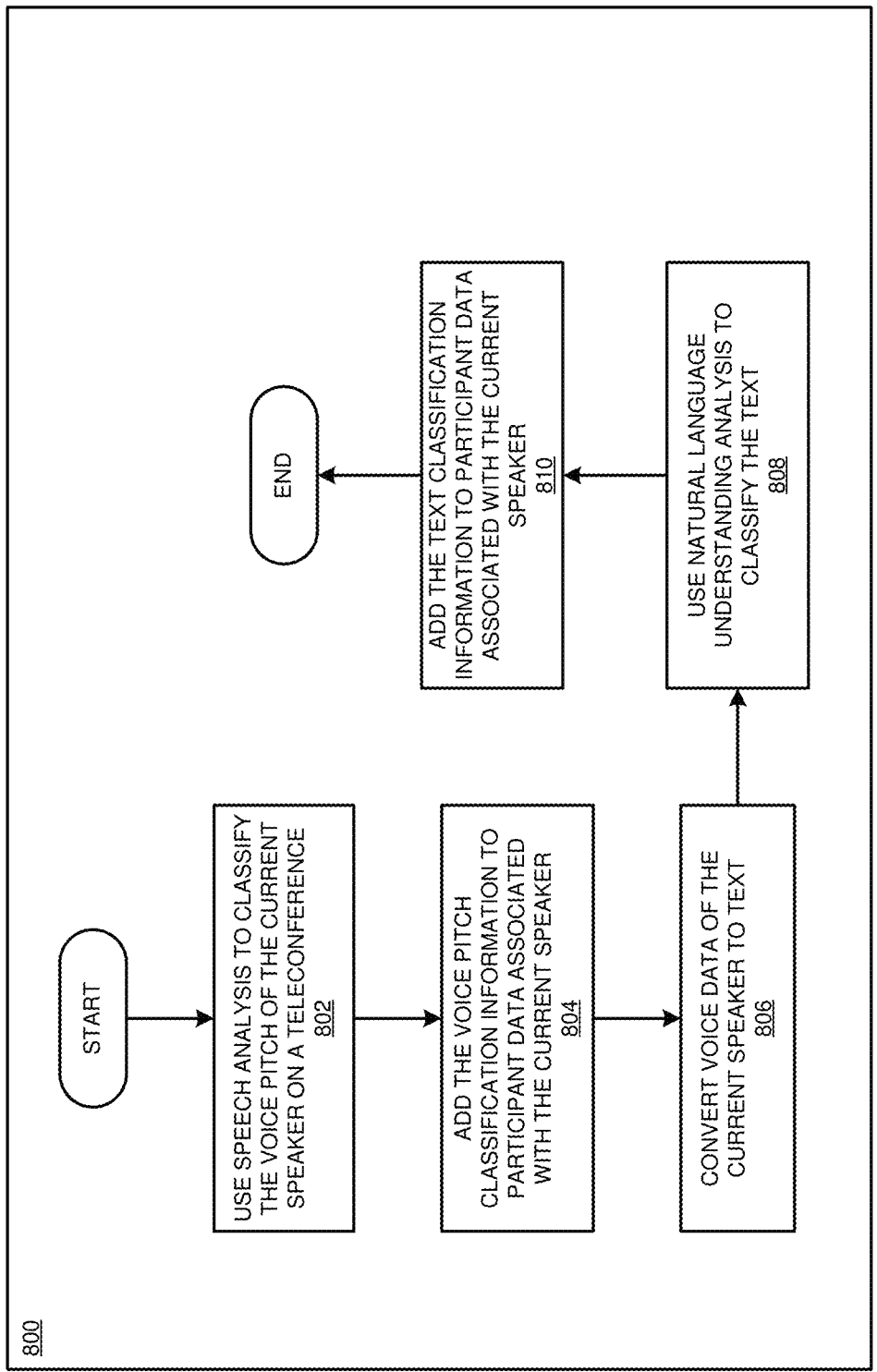
FIG. 8 depicts a flowchart of portion of an example process for an automated written conference call speaker indicator for text entry in accordance with an illustrative embodiment.

With reference to FIG. 8, this figure depicts a flowchart of portion of an example process for an automated written conference call speaker indicator for text entry in accordance with an illustrative embodiment. Process 800 can be implemented in application 300 in FIG. 3.

In block 802, the application uses speech analysis to classify the voice pitch of the current speaker on a teleconference. In block 804, the application adds the voice pitch classification information to the participant data associated with the current speaker. In block 806, the application converts voice data of the current speaker to text. In block 808, the application uses natural language understanding analysis to classify the text. In block 810, the application adds the text classification information to the participant data associated with the current speaker. Then the application ends.

Thus, a computer implemented method, system or apparatus, and computer program product are provided in the illustrative embodiments for an automated written conference call speaker indicator for text entry and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:

analyzing, while a teleconference is occurring, data of the teleconference to determine first participant data associated with a first speaker and second participant data associated with a second speaker;

converting, while the teleconference is occurring, voice data of the teleconference to text;

analyzing, using natural language understanding, the text to classify text converted from the voice data associated with the first speaker according to an emotion;

adding emotion classification information of the text converted from the voice data associated with the first speaker to the first participant data associated with the first speaker;

causing, at a different application, addition of a first speaker indicator and a second speaker indicator to text entered by a user in a document, the different application configured to accept the text entered by the user while the teleconference is occurring, the first speaker indicator added concurrently with identification that the first speaker is speaking and the second speaker indicator added concurrently with identification that the second speaker is speaking, the first speaker indicator and the second speaker indicator modifying an appearance of the text entered by the user; and causing, at the different application, addition of key information to the document, the key information comprising the first participant data associated with the first speaker and the second participant data associated with the second speaker.

2. The method of claim 1, wherein the first participant data associated with the first speaker comprises profile information of the first speaker.

3. The method of claim 1, wherein the first participant data associated with the first speaker comprises device information of a device used to access the teleconference.

4. The method of claim 1, further comprising:

analyzing, while the teleconference is occurring, the voice data of the teleconference to identify a first speech pattern of the first speaker and a second speech pattern of the second speaker;

adding the first speech pattern of the first speaker to the first participant data associated with the first speaker;

adding the second speech pattern of the second speaker to the second participant data associated with the second speaker;

analyzing, using speech analysis while the teleconference is occurring, voice data of the teleconference to classify a voice pitch of the first speaker; and adding classification information of the voice pitch of the first speaker to the first participant data associated with the first speaker.

5. The method of claim 1, further comprising:

analyzing, using natural language understanding, the text to classify text converted from the voice data associated with the first speaker according to a sentiment; and adding sentiment classification information of the text converted from the voice data associated with the first speaker to the first participant data associated with the first speaker.

6. The method of claim 1, wherein the first speaker indicator is configurable by the user.

7. The method of claim 1, wherein the first speaker indicator comprises at least one of a text color and a background color of text.

8. The method of claim 1, wherein the first speaker indicator comprises at least one of a style of text and a text font.

9. The method of claim 1, wherein the first speaker indicator comprises a text sequence.

10. The method of claim 1, wherein the first speaker indicator comprises text or graphics associated with the first speaker.

11. A computer usable program product comprising one or more computer-readable storage devices, and program instructions stored on at least one of the one or more storage devices, the stored program instructions comprising:

program instructions to analyze, while a teleconference is occurring, data of the teleconference to determine first participant data associated with a first speaker and second participant data associated with a second speaker;

program instructions to convert, while the teleconference is occurring, voice data of the teleconference to text;

program instructions to analyze, using natural language understanding, the text to classify text converted from the voice data associated with the first speaker according to an emotion;

program instructions to add emotion classification information of the text converted from the voice data associated with the first speaker to the first participant data associated with the first speaker;

program instructions to cause, at a different application, addition of a first speaker indicator and a second speaker indicator to text entered by a user in a document, the different application configured to accept the text entered by the user while the teleconference is occurring, the first speaker indicator added concurrently with identification that the first speaker is speaking and the second speaker indicator added concurrently with identification that the second speaker is speaking, the first speaker indicator and the second speaker indicator modifying an appearance of the text entered by the user; and program instructions to cause, at the different application, addition of key information to the document, the key information comprising the first participant data associated with the first speaker and the second participant data associated with the second speaker.

12. The computer usable program product of claim 11 wherein the first participant data associated with the first speaker comprises profile information of the first speaker.

13. The computer usable program product of claim 11, wherein the first participant data associated with the first speaker comprises device information of a device used to access the teleconference.

14. The computer usable program product of claim 11, further comprising:

program instructions to analyze, while the teleconference is occurring, the voice data of the teleconference to identify a first speech pattern of the first speaker and a second speech pattern of the second speaker;

program instructions to add the first speech pattern of the first speaker to the first participant data associated with the first speaker;

program instructions to add the second speech pattern of the second speaker to the second participant data associated with the second speaker;

program instructions to analyze, using speech analysis while a teleconference is occurring, voice data of the teleconference to classify a voice pitch of the first speaker; and program instructions to add classification information of the voice pitch of the first speaker to the first participant data associated with the first speaker.

15. The computer usable program product of claim 11, further comprising:

program instructions to analyze, using natural language understanding, the text to classify text converted from the voice data associated with the first speaker according to a sentiment; and program instructions to add sentiment classification information of the text converted from voice data associated with the first speaker to the first participant data associated with the first speaker.

16. The computer usable program product of claim 11, wherein the first speaker indicator is configurable by the user.

17. The computer usable program product of claim 11, wherein the first speaker indicator comprises at least one of a text color and a background color of text.

18. The computer usable program product of claim 11, wherein the computer usable code is stored in a computer readable storage device in a data processing system, and wherein the computer usable code is transferred over a network from a remote data processing system.

19. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to analyze, while a teleconference is occurring, data of the teleconference to determine first participant data associated with a first speaker and second participant data associated with a second speaker;

program instructions to convert, while the teleconference is occurring, voice data of the teleconference to text;

program instructions to analyze, using natural language understanding, the text to classify text converted from the voice data associated with the first speaker according to an emotion;

program instructions to add emotion classification information of the text converted from the voice data associated with the first speaker to the first participant data associated with the first speaker;

program instructions to cause, at a different application, addition of a first speaker indicator and a second speaker indicator to text entered by a user in a document, the different application configured to accept the text entered by the user while the teleconference is occurring, the first speaker indicator added concurrently with identification that the first speaker is speaking and the second speaker indicator added concurrently with identification that the second speaker is speaking, the first speaker indicator and the second speaker indicator modifying an appearance of the text entered by the user; and program instructions to cause, at the different application, addition of key information to the document, the key information comprising the first participant data associated with the first speaker and the second participant data associated with the second speaker.

\* \* \* \* \*